Jan. 31, 1939. G. J. HUNTLEY ET AL 2,145,765
FILLING MACHINE
Filed May 15, 1933 9 Sheets-Sheet 1

Inventors
George J. Huntley
Robert J. Stewart
By Cushman, Darby & Cushman
Attorneys

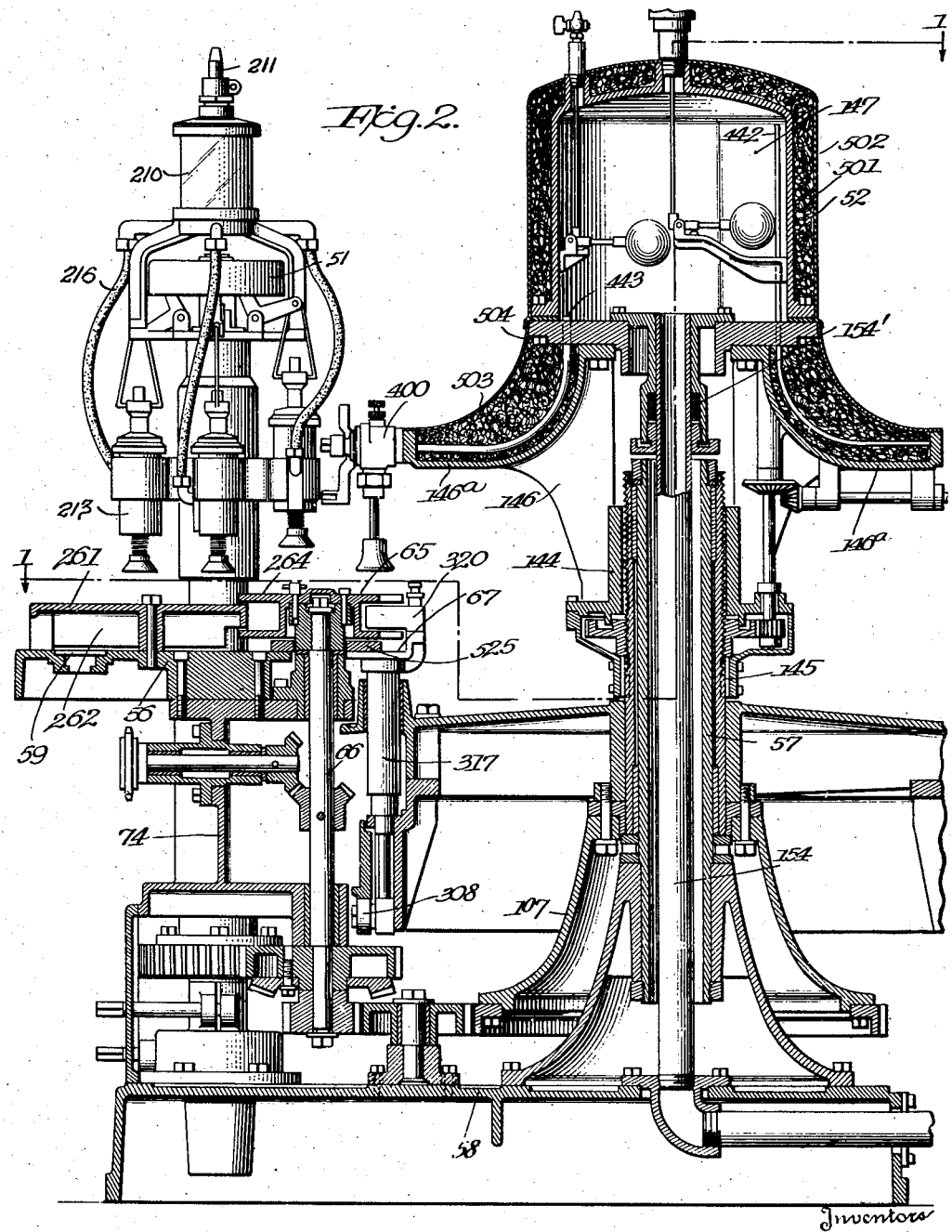

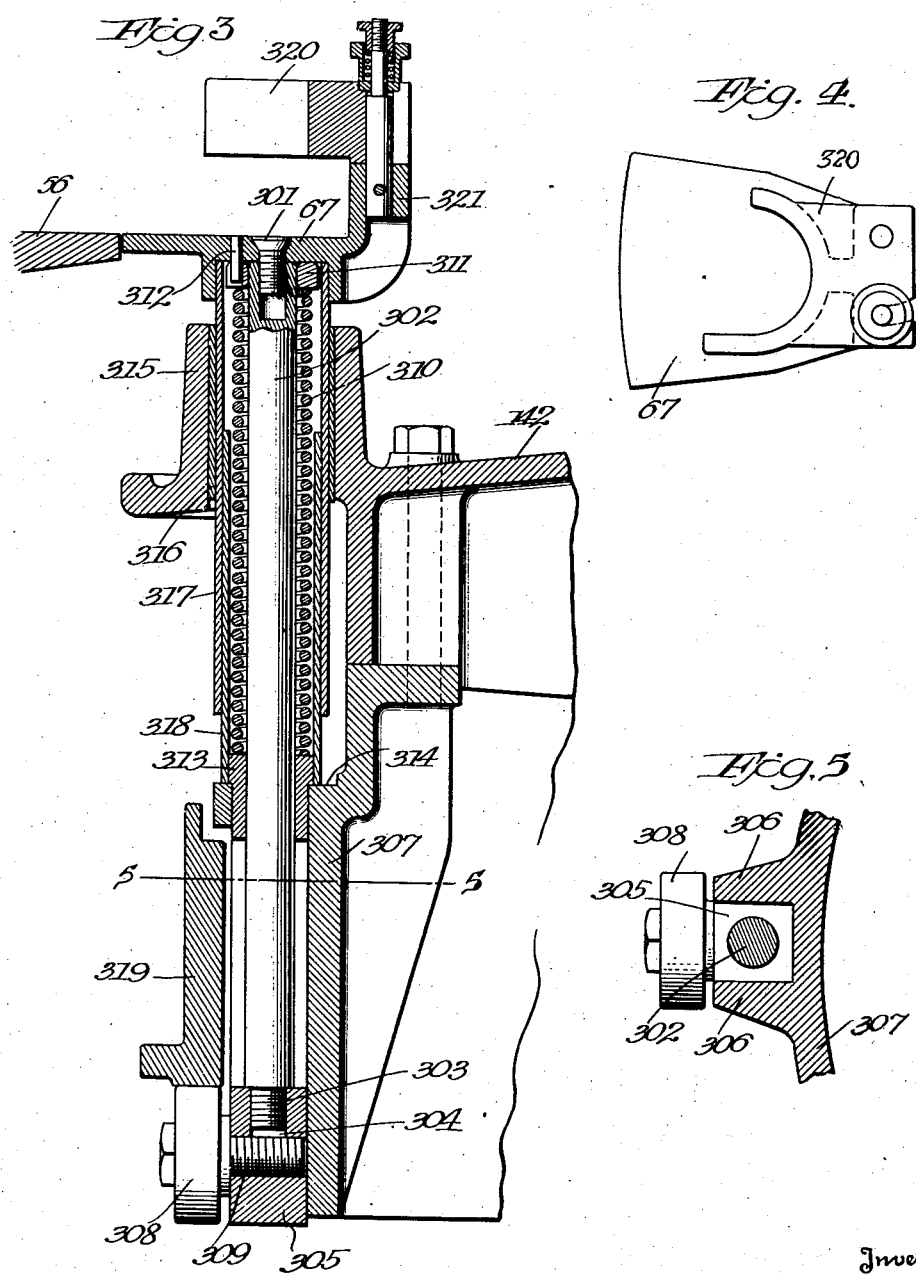

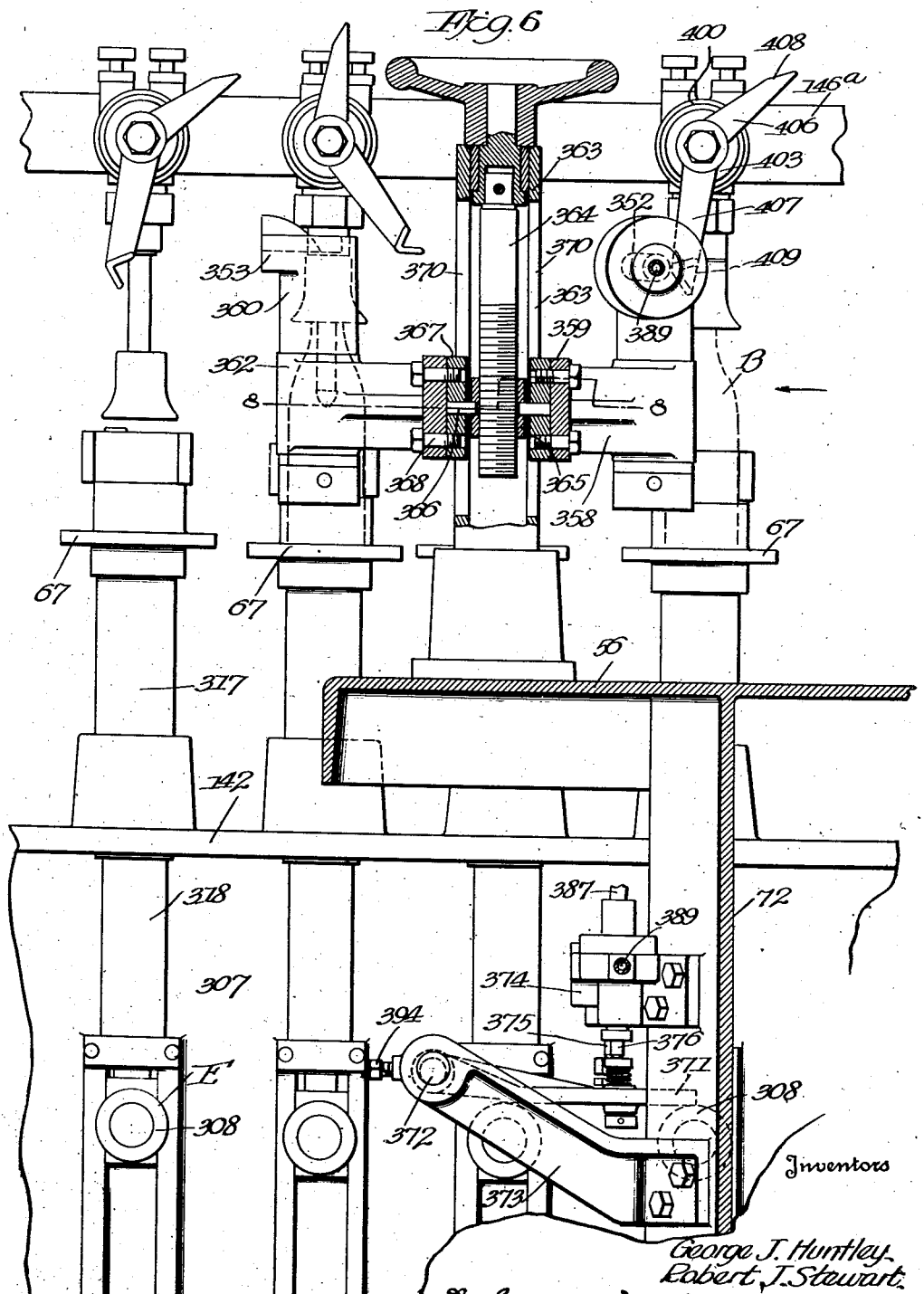

Jan. 31, 1939.　　　G. J. HUNTLEY ET AL　　　2,145,765
FILLING MACHINE
Filed May 15, 1933　　　9 Sheets-Sheet 5
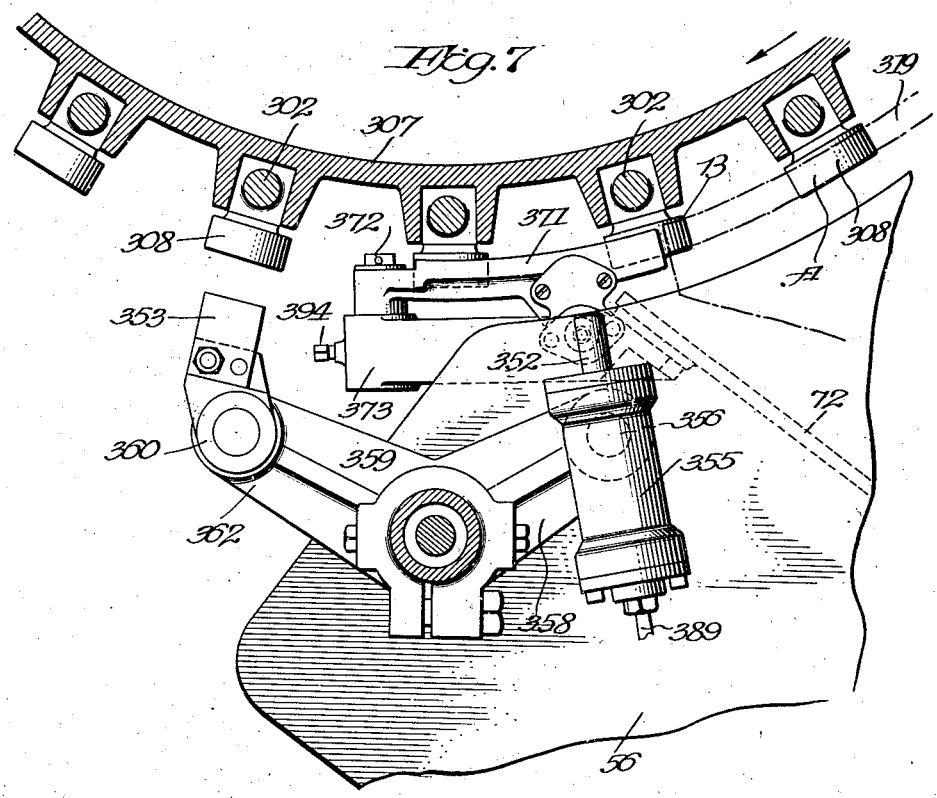
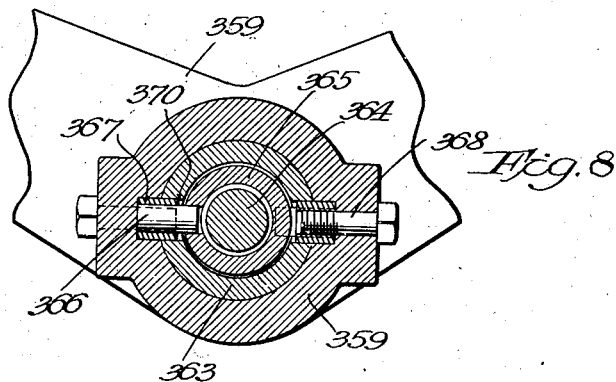
Inventors
George J. Huntley
Robert J. Stewart
By Cushman, Darby & Cushman
Attorneys Jan. 31, 1939.  G. J. HUNTLEY ET AL  2,145,765
FILLING MACHINE
Filed May 15, 1933  9 Sheets-Sheet 6
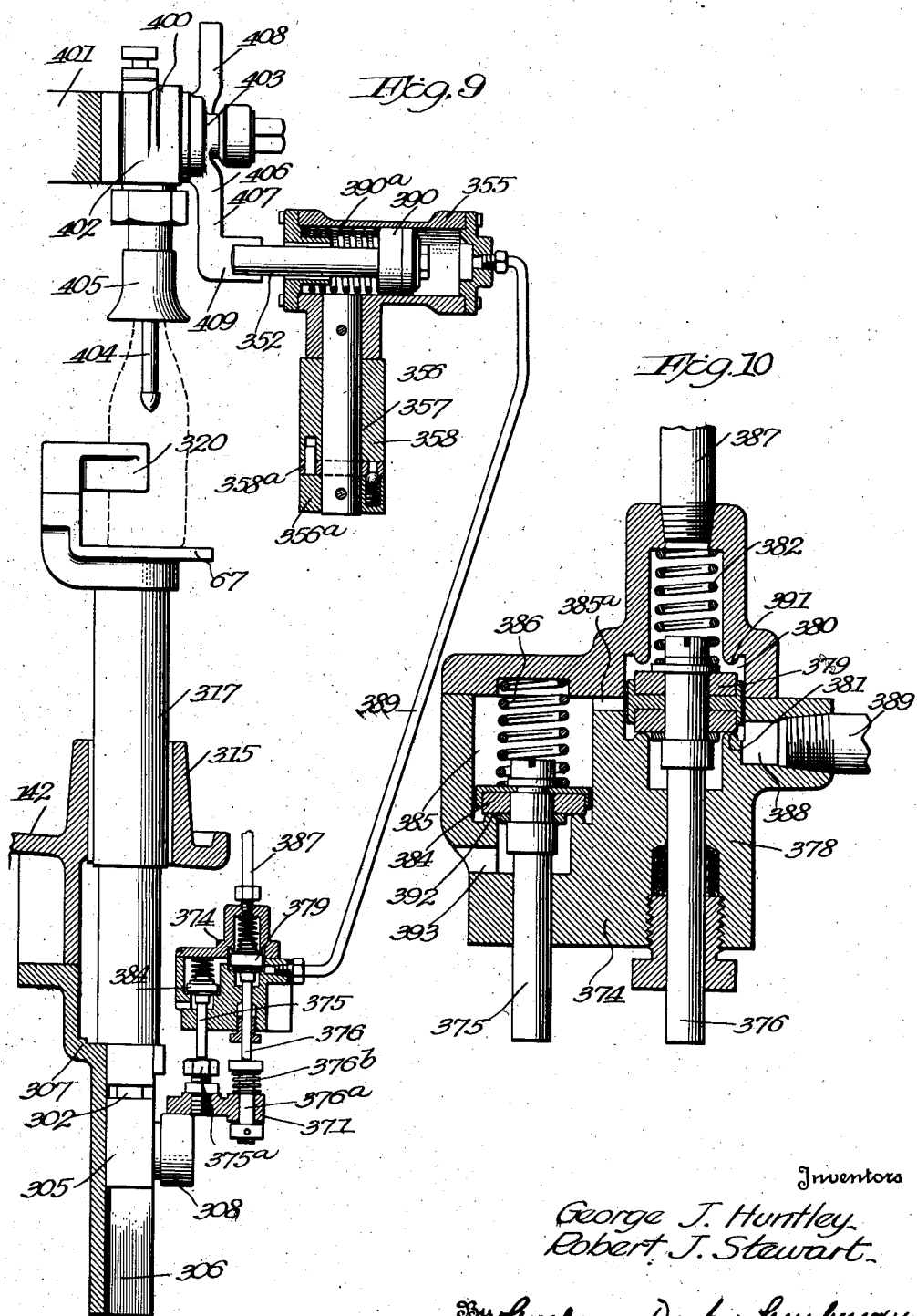
Inventors
George J. Huntley
Robert J. Stewart
By Cushman, Darby & Cushman
Attorneys

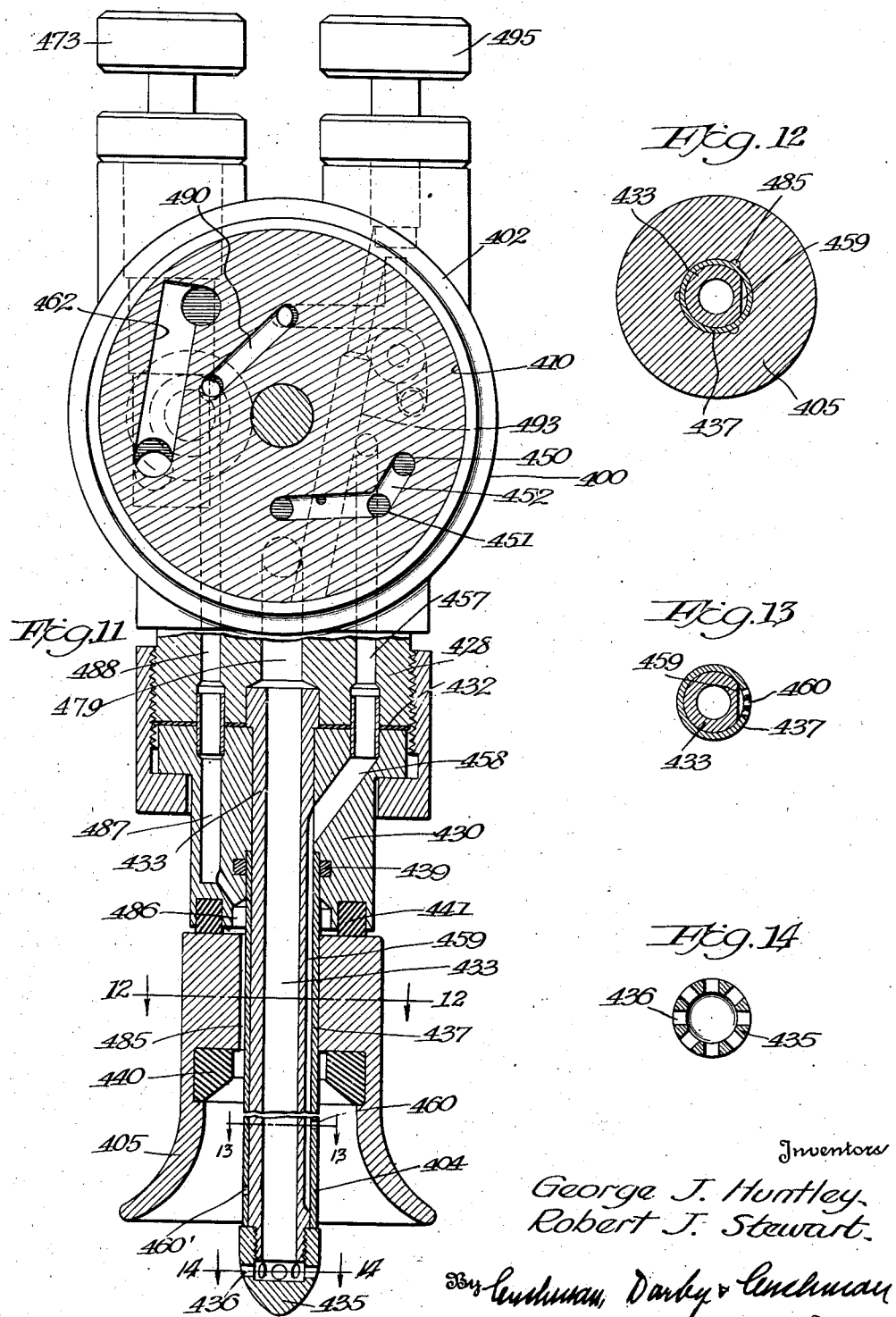

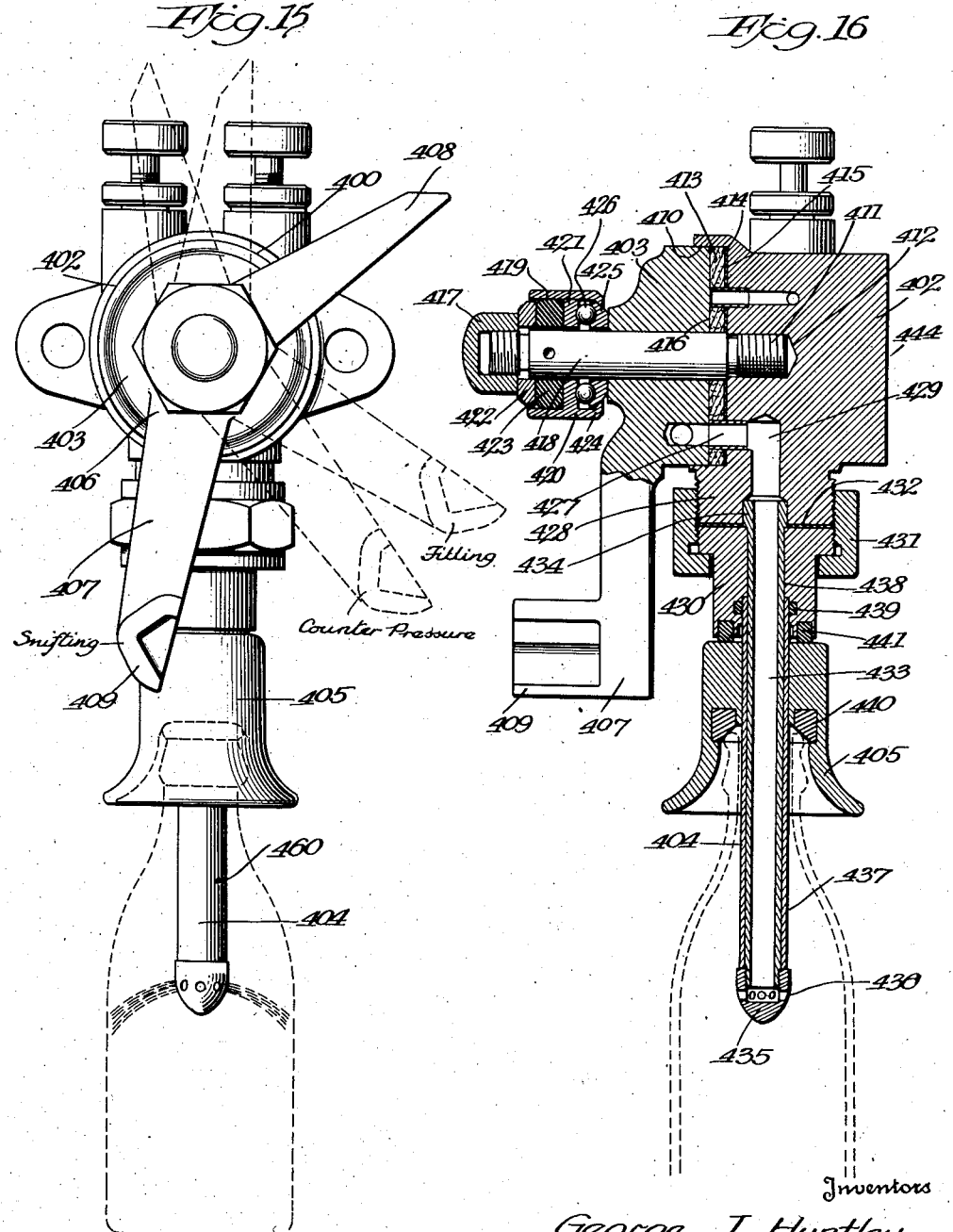

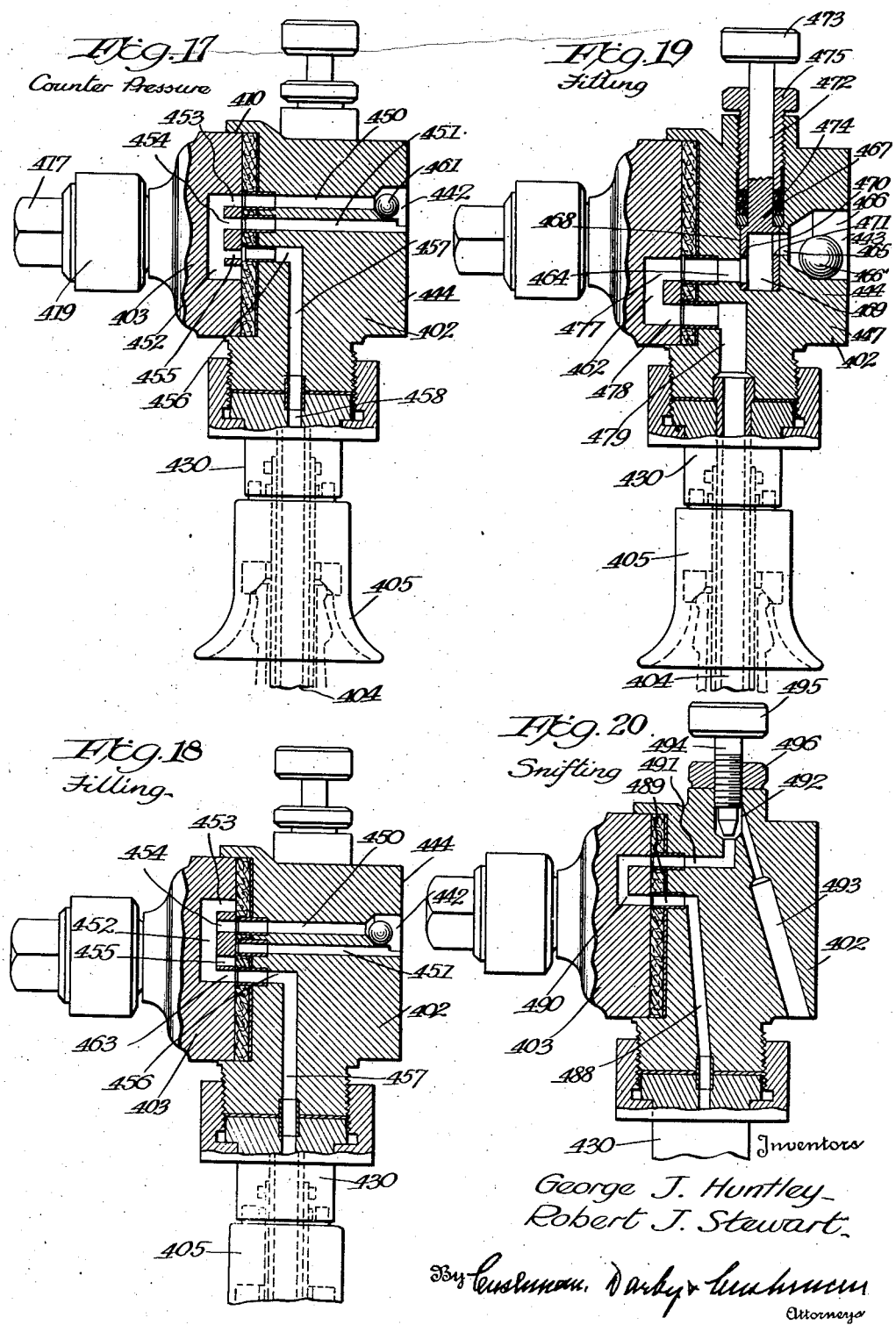

Patented Jan. 31, 1939

2,145,765

UNITED STATES PATENT OFFICE 2,145,765

FILLING MACHINE

George J. Huntley and Robert J. Stewart, Baltimore, Md., assignors to Crown Cork & Seal Company, Inc., Baltimore, Md., a corporation of New York Application May 15, 1933, Serial No. 671,266

24 Claims. (Cl. 226—98)

The present invention relates to filling machines.

In filling bottles with charged beverages by the "high-low" method of filling, it is customary to seal each bottle to a filling head for the filling operation, the filling head being connected by suitable piping to a filling reservoir elevated above the filling head and containing charged water and, above the water, a body of gas. The first step of the filling operation is to establish a pressure, generally referred to as "counter-pressure", in the bottle, this pressure being equal to the pressure of the gas above the water in the water and gas reservoir. The second operation is to permit the charged water to flow from the reservoir into the bottle through the filling head. Since the pressure in the bottle and the pressure in the reservoir are now identical, the water only flows into the bottle by reason of the head of water resulting from the elevation of the reservoir above the bottle and as the reservoir is not greatly elevated above the filling head, the flow of water will be comparatively slow. During the flow of water into the bottle, the pressure in the bottle is vented back to the reservoir, but the filling is terminated before the level of the water in the bottle reaches the mouth of the bottle, and the air and gas confined above the level of the water will be compressed by the rising water. In order to gradually release this pressure before the mouth of the bottle is opened to the atmosphere, a third step, snifting, is performed, comprising releasing the pressure above the surface of the water in the bottle through a very small vent. The bottle is then moved out of engagement with the filling head.

The filling heads beneath which the steps of the filling operation are conducted each usually comprise a valve body carrying a filling nozzle and a valve movable on a valve seat of the valve body. The valve body is provided with a number of passages therethrough extending from the valve seat and communicating with the filling reservoir for the counter-pressure flow and the filling and venting flow. Another passage extends from the valve seat to atmosphere for the snifting flow. The valve body is also provided with a second series of ports extending from the valve seat to the filling nozzle and corresponding to the above mentioned ports. The valve upon the valve body is provided with a number of channels or passages which are adapted to be successively aligned with corresponding passages in the two series of passages of the valve body to carry out the steps of the filling operation. Filling trips are provided about the path of movement of the filling heads to move the filling valves to the successive positions which they occupy for the various steps of the filling operation.

Because of the high pressures passing from the valve body and through the valve, the joint between these two parts must be relatively tight, so as to prevent all possibility of leakage and yet must not be so tight as to cause the valve to stick. In the filling heads now generally used, a tight and close fit between the valve body and valve results in rapid wearing of these parts. This requires that the two be adjusted with respect to each other from time to time, but the continual wear between the parts causes the timing of the various steps of the filling operation to get out of adjustment with respect to each other. This may result in prolonging the time of some of the steps of the filling operation and shortening the time of other steps and since each filling head must be very accurately adjusted so that each step of the operation will be completed in time for the commencement of the next succeeding operation, the operation of the machine becomes unsatisfactory. If the filling machine comprises a large number of filling heads, the valve of each of which is worn to a varying degree, filling heads become so greatly out of time that efficient operation is extremely difficult.

An important object of our invention is to provide a filling head which is designed to accurately perform each step of the filling operation and in which the valve body and valve are so arranged that they may be held tightly in contact with each other with but a minimum possibility of any wear occurring between the two parts.

Another important object of the invention is to provide an arrangement for causing an individual filling head to be rendered inoperative in the event that no bottle is positioned beneath that filling head, thereby preventing the waste of filling water as well as unnecessary wetting of the machine.

Numerous arrangements have been provided in prior art machines for preventing the waste of filling water when no bottle is positioned beneath a filling head. In some of these arrangements, the entire machine has been stopped upon the failure to position a bottle beneath the filling head. By other constructions, the filling head valve has been rendered inoperative for the filling step, but no provision has been made to prevent the operation of the valve to other steps in the filling cycle. In still other machines, separate devices have been provided at each of the filling trips to successively prevent the operation of each of the trips to actuate the filling valve.

In the arrangement embodied in our machine, the trips which cooperate with the filling head valve to successively move the latter to the various steps of the filling cycle are spaced about the machine in the usual manner, but means are provided to render the counter-pressure trip inoperative with respect to a filling head if no bottle is positioned beneath that head. Also, the counter-pressure trip, filling trip and filling valve are so designed with respect to each other that if the counter-pressure trip is rendered inoperative and fails to actuate the valve to counter-pressure position, the valve will subsequently fail to make contact with the filling trip. It will be noted that by this construction, wherein the counter-pressure trip is rendered inoperative, counter-pressure gas as well as filling water will be conserved.

Our mechanism to render a filling head inoperative when no bottle is positioned beneath the head is so designed that it will properly coact with each succeeding filling head to operate or fail to operate the latter, according to whether the head is or is not aligned with a bottle to be filled.

Another object of the present invention is to provide a filling nozzle which is so designed that each bottle of a run of bottles will be filled to exactly the same height.

Members of the bottling trade make particular efforts to have each bottle in a case of bottles filled to the same height since there can then be no question in the mind of the retailer or the ultimate consumer as to "short-filling" of any bottle in the case.

To meet the demand for uniform height of filling, the filling heads of our invention are each provided with a filling nozzle so designed that the filling of a bottle will be automatically stopped when the level of the liquid in the bottle rises to a predetermined point. When the level of the liquid reaches this point, the venting of air from the bottle will be discontinued, thereby preventing more liquid from flowing into the bottle. The filling nozzle includes extremely simple means to permit the height of the air vent outlets with respect to the filling nozzle to be very readily adjusted without requiring any adjustment of the filling nozzle itself, and the adjustment of the height of filling may therefore be readily accomplished.

The filling system used with the present machine is generally similar to the well known "English" filling system, but the various novel arrangements of the structure discussed above whereby the filling is conducted and other arrangements which will be apparent from the specification and drawings, eliminate all of the disadvantages of the English filling system, an important object of the present invention being to provide a filling machine which will operate in accordance with the English or "high-low" filling system but which is so substantially improved over machines constructed to operate in accordance with that system as to develop the full advantages of the system.

The filling nozzle preferably used with the present machine includes a bottle centering bell which is slidable upon the filling nozzle, so that the mouth of the bottle will be properly centered about the nozzle before the nozzle moves into the bottles. During the filling operation, the centering bell and the filling head proper are sealed together with an air-tight joint and the bottle is snifted through the centering bell and the filling head.

Another important object of our invention is to provide a filling head and connections from the head to the filling reservoir which will make for more efficient filling.

In the operation of filling heads, a considerable amount of water flows from the filled bottle back toward the filling reservoir through the venting passage during the filling step of the filling operation. When the flow of water to the bottle is stopped and the filling valve is moved from filling position to snifting position, the water which has flowed upwardly through the vent passage will be held in the vent passage. When the bottle which has been filled is moved from a filling head and an empty bottle positioned beneath the same head for filling, the water which has been in the vent passage will flow down into the second bottle during the step of establishing counter-pressure in this bottle, since the passage which is used as a vent passage during the filling step is also used as a pressure flow passage during the counter-pressure establishing step. The flow of a considerable amount of water into the bottle ahead of the counter-pressure gas is distinctly undesirable since the pressure of the counter-pressure gas causes the water to be projected against the walls of the bottle with some force and induces disturbance of the gas with which the water is charged.

Our filling head is so constructed and arranged with respect to the filling reservoir that a very short passage is provided between the filling head and the reservoir and this passage is of extremely small diameter. By this arrangement, only a very small quantity of water can ever flow upwardly through the vent passage.

Another object of our invention is to so construct the filling mechanism that the charged water will be kept cool and at proper temperature to hold the carbon-dioxide gas with which the filling water is charged in the filling water throughout the flow of the latter through the passages of the filling mechanism.

To attain this object, we enclose the filling reservoir and the pipes extending from the filling reservoir to the filling heads in a body of insulating material, thereby preventing any increase in the temperature of the filling water.

Another object of our invention is to provide a machine which may be operated at relatively high speeds over a long period of time and the parts of which are so arranged that the entire machine may be readily adjusted for various sizes of bottles or to compensate for any wear which may occur.

It will be understood that the apparatus of the present invention may be used to fill containers of any type with fluids of various natures.

Numerous other objects and advantages of the machine will be apparent from the following specification and drawings, in which:

Figure 2 is a vertical sectional view taken on the line 2—2 of Figure 1;

Figure 3 is a vertical sectional view through one of the bottle supporting platforms of the filling mechanism, showing the platform in the position it occupies when adjacent the worktable;

Figure 4 is a plan view of one of the bottle supporting platforms;

Figure 5 is a horizontal sectional view on the line 5—5 of Figure 10;

Figure 6 is a detail elevation showing the arrangement and operation of the counter-pressure and filling trips, parts of the mechanism being shown in vertical section;

Figure 7 is a horizontal sectional view of the mechanism illustrated in Figure 6, but with the filling heads removed;

Figure 8 is a detail horizontal sectional view on the line 8—8 of Figure 6;

Figure 9 is a vertical sectional view of the structure shown in Figure 7 and including a filling head;

Figure 10 is a sectional view through the counter-pressure trip controlling valve;

Figure 11 is a view of one of the filling heads, showing the passages and ports of the valve body and valve, the filling nozzle being shown in vertical section. In this view, the filling valve is shown rotated just slightly past true snifting position in order to make the arrangement of the aligned passages more apparent;

Figure 12 is a horizontal sectional view on a line corresponding to 12—12 of Figure 11;

Figure 13 is a horizontal sectional view on a line corresponding to 13—13 of Figure 11;

Figure 14 is a horizontal sectional view on a line corresponding to 14—14 of Figure 11;

Figure 15 is an elevation of a filling head with a bottle positioned about the filling nozzle, showing the filling valve arm in snifting position. The two other operating positions of the valve arm are shown in dotted line;

Figure 16 is a central vertical sectional view of the structure shown in Figure 15;

Figure 17 is a vertical sectional view through the filling head and valve in counter-pressure position, the view being diagrammatic in that it shows the passages and ports used in the counter-pressure step in the same vertical plane;

Figure 18 is a view of the same type as Figure 17, but showing the venting ports used in filling in the same vertical plane;

Figure 19 is a view also of the same type as Figure 17, but showing the passages used for filling during the filling operation and in the same vertical plane;

Figure 20 is a view of the same type as the three preceding figures, but with the passages used during snifting shown in the same vertical plane.

Figure 1:
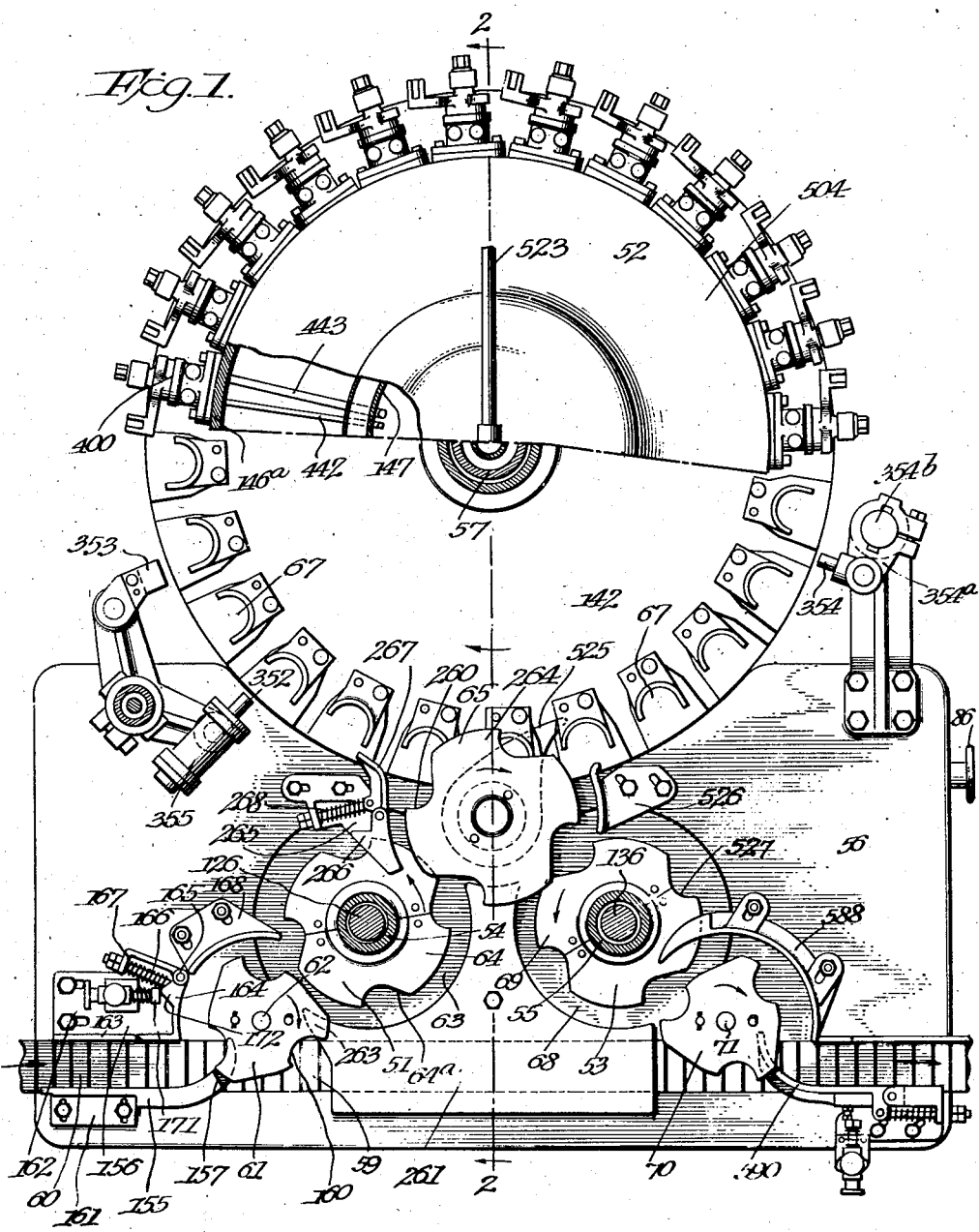
Figure 1 is a horizontal sectional view of the machine taken on the line 1—1 of Figure 2.

Our filling machine comprises a syruping mechanism 51, a filling mechanism 52 and a crowning mechanism, not shown, the syruping mechanism and crowning mechanism being supported upon hollow rotatable shafts 54 and 55, respectively, extending up through the worktable 56, while the filling mechanism is rotatably supported adjacent the rear edge of the worktable, upon a vertical column 57 extending upwardly from the base 58 of the machine.

As is best shown in Figure 1, a straight line endless conveyor 59 having the surface of its upper run flush with the level of the worktable 56 feeds the bottles into the machine at 60, the bottles being removed from the conveyor 59 by an infeed spider 61 fixed to a stub shaft 62 journalled in the worktable. The bottles are moved about the spider 61 in a clockwise direction to a rotary table 63 and spider 64 included in the syruping mechanism and are removed from the syruping table and spider by a central or transfer spider 65, which is fixed to a vertical shaft 66 journalled in the worktable and base. The transfer spider 65 moves the bottles about its left-hand portion to position them upon bottle supporting platforms 67 spaced about the filling mechanism 52. The rotating filling mechanism moves the bottles thereabout in a clockwise direction (Fig. 1) and returns the bottles, filled, to the right-hand portion of the transfer spider 65. The bottles are removed from the filling mechanism and are moved about the right hand side of the transfer spider 65 to a rotary table 68 and spider 69 included in and forming part of the crowning mechanism not shown, but which is preferably of the rotary type provided with vertically reciprocating crowning heads as shown in our application for Filling machine, filed April 19, 1938, a division of the present application. During the movement of the bottles about the crowning mechanism spider 69 in a counter-clockwise direction, they are crowned and are removed from the latter spider by an outfeed spider 70 secured to a stub shaft 71 journalled in the worktable 56. The outfeed spider 70 moves the bottles in a clockwise direction upon the worktable to the right-hand end of the straight line conveyor 59, which moves the bottles from the machine.

Worktable 56 is carried by a supporting structure comprising side walls and a front wall 74, all extending upwardly from the base 58 as shown in Figure 2.

The syruping mechanism 51, filling mechanism 52 and the crowning mechanism mounted on the shaft 55 above the crowning spider 53 are rotated in synchronism by suitable driving mechanism described in our said divisional application filed April 19, 1938, this mechanism also effecting movement of the straight line conveyor 59 and rotation of the various bottle feeding spiders described above.

A charged water supply pipe 154 extends through the base 58 of the machine and upwardly through the column 57 to the filling reservoir 147. A packed slip joint 154' is provided between the lower wall of the reservoir and the pipe 154, so that the reservoir may rotate relatively to the pipe and may be adjusted vertically with respect thereto.

Bottles are guided in their movement from the straight line conveyor 59 to the infeed spider 61 by means of a guide member 155 positioned on the worktable 56 at the outer side of the straight line conveyor and also by a guiding device generally indicated by the numeral 156 positioned on the inner side of the straight line conveyor and extending opposite the infeed spider 61 throughout the path of movement of the bottles about the spider. The outer guide member 155 is curved at its inner end, as shown at 157, to direct the bottles inwardly toward the spider and upon the worktable, this end of the guide being reduced in vertical cross-section, so that it may project between the upper and lower spaced flanges of the spider 61. The flanges of the spider are provided with pockets 160 to engage the bottles fed thereto by the straight line conveyor. In order to permit the machine to operate upon bottles of various sizes, the outer guide member 155 is mounted for adjustment, having a flange 161 adjustable on the worktable.

The inner guide member 156 includes a base plate 162 adjustably secured to the worktable 56 by means of bolts extending through slots in the plate and threaded into the surface of the worktable, as shown. The plate 162 has a vertical flange 163 thereon extending along the inner side of the conveyor 59. An angled vertical plate 164 is pivotally mounted upon the plate 162 at 165, the angled plate 164 being normally held in the position shown in Fig. 1 by means of a coil spring 166 surrounding a stud secured to the plate 164 adjacent its pivot point, the inner end of the spring bearing against the rear surface of the angled plate and its outer end bearing upon the inner surface of a bracket 167 fixed with respect to the base plate 162. The stud is slidable through the bracket 167 and may be provided with lock nuts to normally hold the angled plate 164 in proper position. The free end of the angled plate 164 overlaps the adjacent end of the upstanding flange 163 of the base plate 162, so that the angled plate will be held in proper inward position with respect to the spider 61 and straight line conveyor 59. The inner guiding element 156 also includes a curved guide plate 168 surrounding the inner portion of the path of travel of the bottles about the spider, plate 168 including a horizontal angled portion resting upon the worktable 56 and held thereto by bolts extending through slots in the horizontal portion.

Means is provided in connection with the inner guiding element 156 for preventing jamming of the receptacles being fed from the straight-line conveyor 59 to the spider 61, these means being so arranged that the machine will be stopped whenever a jam occurs. This means is described in our above-mentioned divisional application filed April 19, 1938. As shown in Figure 2, the syrup enters the syrup reservoir 210 of the machine by a pipe line 211 leading from a storage tank.

Syrup flows to the syruping heads 213 through lines 216 and thence to each bottle moving with the syruping spider 64 by the mechanism described in detail in our divisional application Serial No. 6,720, Filling head, filed February 15, 1935.

The bottles will be held properly positioned upon the syruping table 63 and in the pockets 64a of the syruping spider by a central guide element 261 which is provided with downwardly extending walls 262 of sufficient height to prevent the bottles from falling over or moving from the rotating syruping table. As is shown in Figure 1, the central guide member 261 includes an extension 263 which projects between the spaced plates of the infeed spider 61 so that the bottles will be properly moved from the latter spider by the syruping spider. The inner end of the guide member 261 extends between the spaced plates 264 of the transfer spider 65 to properly guide the bottles from the syruping spider to the transfer spider. As is indicated in Figure 1, the spaced plates 264 of the spider 65 are spaced above and below the spider 64 of the syruping mechanism so that the two spiders may interengage about a bottle.

The transfer spider 65 is formed and secured to its shaft 66 in the manner described in our above-mentioned divisional application filed April 19, 1938, to permit it to be removed so that spiders of various sizes may be used on the shaft 66. A similar arrangement would be used with the other spiders of the machine.

A guide member shown in Figure 1 is provided to properly direct the movement of bottles about the left hand side of the transfer spider 65 from the syruping mechanism to a bottle supporting platform 67 of the filling mechanism. This guiding mechanism comprises a plate 265 secured to the worktable 56 by bolts threaded into the worktable and extending through slots in the plate to permit adjustment of the latter for runs of bottles of various sizes. A curved upstanding guide element 266 extends across the surface of the table 63 of the syruping mechanism, this element being bifurcated so that it extends above and below the syruping spider 64. A movable guide plate 267 is pivoted to the guide element 266. The curved and movable guide plate 267 is normally held in position to properly guide the course of bottles from the pockets 260 of the transfer spider 65 to the bottle supporting platforms 67 by a coil spring 268 about a bolt pivoted to the rear surface of the movable plate 267, one end of the spring bearing against the movable plate and the other end contacting with an upstanding bracket on the horizontal and fixed plate 265. Lock nuts may be provided upon the bolt to limit inward movement of the movable plate.

*The filling mechanism bottle platforms*

A plurality of bottle supporting platforms 67 are reciprocably mounted in the rotary table 142 of the filling mechanism 52. As shown in Figures 3, 4 and 5, each bottle platform is secured by a machine screw or the like 301 to a rod 302 which is provided with a threaded portion 303 at its lower end which threadedly engages a bore 304 in a slide block 305. The slide block is movable between slideways 306 extending outwardly from a skirt 307 secured to the lower outer edge of the table 142. A roller 308 is rotatably mounted upon a stud 309 threaded in a horizontal bore in the block 305. A coil spring 310 is mounted about the rod 302, the upper end of the coil spring bearing upon a collar 311 welded to the upper end of the rod 302 beneath the surface of the bottle platform 67. The rod 302 is held against rotation by means of a pin 312 extending from the bottle platform into a cutout portion in the collar 311. The lower end of the spring 310 bears upon a collar 313 mounted upon the rod 302 and provided with a shoulder which engages a shoulder 314 on the outer surface of the skirt 307 of the table 142. The table 142 is provided with an upstanding boss 315 through which the rod 302 extends in a vertical bore 316 provided through the boss. Telescoping tubes 317 and 318, respectively, are secured to the underside of the bottle platform 67 and the lower collar 313 to enclose the spring 310 and guide the reciprocating movement of the bottle platform 67. A bushing may be provided in the bore 316 as shown in Figure 3.

During the greater part of the rotation of the filling mechanism, the bottle platforms 67 are in the upper position shown in Figure 9 due to the expansion of the spring 310. A platform is only in the lowered position shown in Figure 3 when the platform is adjacent the worktable 56, at which time, as illustrated in this figure, the roller 308 on a bottle supporting platform will contact with a cam shoulder 319 secured to the supports of the worktable so that the surface of the bottle supporting platform 67 will be flush with the level of the worktable 56 to permit bottles to be moved from the worktable to the platform 67 and vice versa by the transfer spider 65.

Each bottle platform 67 is provided with a bottle engaging member 320, which is removably supported upon an upstanding shoulder 321 on the inner side of the bottle support as described in our above-mentioned divisional application filed April 19, 1938.

*The filling trips*

In the normal operation of the machine, as a bottle supporting platform 67 carried by the rotating filling mechanism approaches the worktable 56 from the right (Figure 1), the roller 308 included in the bottle supporting platform structure will contact with the fixed cam shoulder 319 projecting downwardly from the inner edge of the worktable. Contact of the roller 308 with the cam causes the bottle supporting platform to be drawn downwardly to the position shown in Figure 3 wherein the upper surface of the bottle supporting platform is flush with the upper surface of the worktable. If a filled bottle is on the platform, the transfer spider 65 will remove that bottle as hereinafter described and will position a syruped bottle upon the platform and the bottle will be moved in a counterclockwise direction toward a counter-pressure trip 352 supported above the worktable and hereinafter referred to in detail. The cam 319 is of such configuration that almost immediately after the syruped bottle has been received upon the platform 67, the roller 308 will move clear of the cam, permitting the bottle supporting platform 67 to rise by reason of the expansion of the coil spring 310 included in the bottle supporting platform structure.

The filling mechanism 52 is provided with twenty-four filling heads 400, one positioned above each of the bottle platforms 67 and supported upon the periphery of a bell-shaped skirt 146a depending from the filling reservoir 147. Broadly considered, each filling head comprises a body portion 402 provided with a filling valve 403 to control the flow of liquid, air and gas therethrough in a manner hereinafter explained. Each filling head is also provided with a filling nozzle 404 having a centering bell 405 slidably mounted thereon. The filling valve 403 is provided with a valve lever 406 including a downwardly extending arm 407 and an upwardly extending arm 408. The downwardly extending arm 407 includes an outwardly projecting offset portion 409.

The expansion of the spring 310 of a bottle platform 67 permitted by the movement of the roller 308 from beneath the cam 319 will move the bottle supporting platform 67 upwardly so that the bottle carried thereby will be moved upwardly, the outer periphery of the mouth of the bottle contacting with the inner surface of the centering bell 405 provided on the filling head. The inclined walls of the centering bell will cause the mouth of the bottle to be centered, as it is moved upwardly, so that the mouth of the bottle will move up about the filling nozzle 404 on the filling head. The spring 310 has sufficient length and strength to hold the bottle pressed against the interior of the centering bell to provide a tight seal between the mouth of the bottle and the interior of the bell.

The value lever 406 of each filling head is adapted to be moved to various positions during the rotation of the filling mechanism in order to successively move the valve 403 to counter-pressure position, filling position, and snifting position. The movement of the valves to these positions is accomplished by means of trips spaced about the path of travel of the filling mechanism. As is best shown in Figure 1, these trips comprise the counter-pressure trip 352 and a filling trip 353, both supported on the worktable 56 adjacent the infeed end of the path of travel of the filling mechanism. The snifting trip 354 is also supported on the worktable 56 but is positioned adjacent the outfeed end of the path of travel of the bottles through the filling mechanism.

The detailed construction of the counter-pressure and filling trips and the manner of the operation of the filling valves is best shown in Figures 6, 7 and 9. Referring to Figure 9, it will be observed that the counter-pressure trip 352 is in the form of a plunger reciprocable in a cylinder 355. Cylinder 355 is provided with a depending stud 356 rotatable in a bore 357 in an arm 358 of a bracket 359 (Figure 6) but normally held against rotation by the pressure of a spring-pressed ball carried in a flange 356a on the stud 356 (Figure 9) against a socket in a washer 358a which washer is pinned to the underside of the arm 358. The filling trip 353 is in the form of an arm projecting from a collar 360, which collar is mounted on the other arm 362 of the bracket 359 in the same manner that the counter-pressure trip cylinder 355 is mounted in arm 358. By having the two trips rotatably mounted upon the arms of the bracket 359, they are enabled to move out of the path of any jammed or improperly positioned filling valve lever 406, thereby preventing damage to the trip arms as well as to the valve arms.

As shown in Figures 6 and 8, the bracket 359 is vertically adjustable upon a supporting post 363 fixed to the table 56. The post 363 has a screw shaft 364 therein which is mounted for rotation in the upper end of the post, the upper end of the shaft being provided with an operating handle, as shown. A nut 365 is threaded upon the post 364, which nut is supported by diametrically opposite pins 366 having their inner ends projecting into sockets in the side wall of the nut to hold the nut against rotation. The outer ends of the pins 366 are held in key plates 367 secured by bolts 368 to the opposite inner surfaces of the vertical bore through the bracket 359 by bolts 368. The keys 367 move in diametrically opposite vertical slots 370 formed in the walls of the post 363. It is obvious that by this arrangement, rotation of the threaded shaft 364 will cause the bracket 359 to move vertically. The bracket 359 and the trips carried thereby can thus be moved vertically to be properly positioned for any vertical adjustment of the filling heads and filling valves.

The snifting trip 354 is mounted on a bracket 354a (Figure 1) in the same manner that the filling trip 353 is mounted on bracket 359, and the snifting trip is therefore free to rotate out of the path of a jammed filling valve lever. The bracket 354a is vertically slidable upon a post 354b so that its position may be vertically adjusted to accord with changes in the elevation of the filling valve levers. Post 354b is secured to the worktable 56. The bracket 354a moves on a vertically extending key on post 354b to prevent variance of its angular position with respect to the post.

As has been stated above, during rotation of the filling mechanism, the filling valve lever 406 and the filling valve 403 of each filling head will be successively moved to different positions by the filling trips 352, 353 and 354, thereby filling the bottles carried on the bottle platforms. The structure and operation of the filling heads and valves will be subsequently described.

*The means to render a filling head inoperative when no bottle is aligned with the filling nozzle thereof*

The means to render a filling head inoperative when no bottle is aligned with the filling nozzle of that filling head includes a release control lever 371 pivoted at 372 to a bracket 373 which is secured to the supporting structure of the worktable 56. The release control lever 371 is normally held in the position shown in Figures 6 and 9 by the passage of the rollers 308 beneath the same in a manner hereinafter described. A valve casing 374 is secured on the supporting structure of the worktable 56 immediately above the bracket 373 and two valve stems 375 and 376 respectively project from the lower side of the valve casing toward the release control lever 371. Release control lever 371 carries an upwardly projecting adjustable tappet 375a which contacts with the lower end of a valve stem 375 and a second tappet 376a is held in contact with the lower end of a valve stem 376 by a coil spring 376b.

As is best shown in Figures 9 and 10, the valve stems 375 and 376 are slidable in the valve casing 374, stem 376 carrying a two-faced disk valve 379 at its upper end within a valve chamber 380, which valve is normally held seated against the lower seat 381 by a spring 382 positioned between the upper face of the valve and the lower surface of the upper wall of the valve chamber. Valve stem 375 has a relief valve 384 secured to its upper end, which valve is normally held seated against the seat 392 in a valve chamber 385 by a coil spring 386 positioned between the upper surface of the valve and the upper wall of the valve chamber.

With the valves in the normal position described, compressed air flows into the upper end of the valve chamber 380 through a pipe 387 connected to a source of air under pressure. Air may flow into chamber 385 from chamber 380 through passage 385a but since valve 384 is seated, the chamber is merely a dead end in the pressure circuit. The air flowing into the valve chamber 380 moves past the valve 379 and out of a lateral port 388 and through a pipe 389 to the cylinder 355 in which a plunger 390 carrying the counter-pressure trip 352 is mounted. The pressure thus acting against the plunger 390 holds the plunger to the left (Fig. 9) against the action of a coil spring 390a, thereby holding the counter-pressure trip 352 outwardly and in operative position.

During the initial movement of a filling head 400 and the bottle platform beneath the same away from the worktable 56, i. e., in the direction of the arrows on Figures 6 and 7, respectively, the roller 308 of the platform moves out of engagement with the cam shoulder 319 beneath the worktable. This permits the platform 67 to be raised by its spring 310 in the manner already described. If a bottle has been positioned on the platform 67 by the transfer spider 65, the spring 310 will move the platform 67 upwardly until the centering bell 405 of the head has been carried upwardly by the mouth of the bottle and into contact with the lower portion of the filling head 400, proper. Since further expansion of the spring 310 is now prevented, the roller 308 on the slide block 305 connected to the bottle platform 67 by the rod 302 will be positioned in a predetermined horizontal plane. With the roller 308 positioned in this plane, the filling head 400 and its bottle platform 67 will continue to move in the direction of the arrows of Figures 6 and 7 and to a position corresponding to that indicated at B in both Figures 6 and 7. At this point, the roller 308 of the platform will move beneath the release control lever 371. Because the platform 67 carries the bottle, the roller 308 will merely have a brushing contact with the release control lever 371 and will not disturb the position of this lever. The position of the counter-pressure trip 352 will therefore not be effected and during movement of the roller 308 beneath release control lever 371, the projection 409 on the lower arm 407 of the filling valve lever 406 will contact with counter-pressure trip 352 and the filling valve 403 will be moved in a counterclockwise direction (Figure 6) to counter-pressure position.

The roller 308 will continue in brushing contact with the release control lever 371 for a short interval of time after the valve lever 406 has been moved to counter-pressure position, but will move out of contact with lever 371 before the valve arm 407 comes in contact with the filling trip 353. When the projection 409 on the valve arm 407 strikes the filling trip 353, it will be swung still further in a counter-clockwise direction (Figure 6) so that the filling head will begin to fill the bottle in a manner subsequently to be described.

When, for any reason, the transfer spider 65 fails to position a bottle upon a bottle supporting platform 67, the movement of the cam roller 308 of that platform clear of the cam shoulder 319 will permit the bottle supporting platform to move slightly upwardly past the position it occupies when a bottle is carried by the platform, due to the fact that the spring 310 of the platform may now expand to maximum extent. The height to which a platform 67 will move when no bottle is present upon the platform is indicated at position E in Figure 6. With the platform at this higher position, the roller 308 of the platform will be sufficiently elevated to press against the under side of the release control lever 371 to swing the latter lever upwardly on its pivot 372. The upward swinging movement of the release control lever 371 will cause the tappets 375a and 376a to respectively move the valve stems 375 and 376 upwardly from the position shown in Figures 9 and 10.

The upward movement of the valve stem 376 will cause the disk valve 379 carried thereby to move upwardly to seat against an upper seat 391 in the valve chamber 380. Movement of the valve against seat 391 will cut off, at this point, the flow of air through the pipe 387 from the tank 178. The simultaneous upward movement of the valve stem 375 will move the release valve 384 carried thereby from its seat 392, thereby permitting the pressure which exists in the valve casing 374, line 389 and in cylinder 355 behind piston 390 to escape through the valve chamber 385 and past valve 384 to atmosphere through a relief port 393. Release of the pressure in the manner described, will permit the spring 390a in the cylinder 355 to move the piston 390 to the right (Figure 9), carrying the counter-pressure trip 352 to inoperative position. Movement of the counter-pressure trip 352 to the right, will move it out of the path of the lateral extension 409 on the lower arm 407 of the filling head valve lever arm 406 and the filling valve 403 will thus move past the counter-pressure trip 352 without being actuated to counter-pressure position.

The height and position of the filling trip 353 which the valve arm 406 normally next strikes is such that when the valve arm is not moved from the position it occupies at position B in Figure 6, it will pass beneath and clear of the filling trip 353 without being actuated to filling position, passing the filling trip 353 at the position indicated at position E in Figure 6. It results from the above, that the filling valve 403 passes filling trip 353 in the same position it occupies when it passed the transfer spider 65, at which time, as hereinafter explained, it was in snifting position. Hence, since the valve is in snifting position, it will not be actuated by the snifting trip 354 and therefore the filling head 400 moves entirely about the filling mechanism without being actuated.

It will be noted, from the above, that the filling heads 400 are individually controlled to prevent their filling operation when no bottle is positioned beneath a filling head. In other words, a waste of filling water is entirely prevented without the necessity of stopping the entire machine or in any way affecting any part of the machine other than the individual filling head.

As shown in Figure 6, the portion of the release control lever 371 with which rollers 308 contact is of such length that a roller 308 which is in upward position will contact with the lever for a sufficient length of time to cause the counter-pressure trip 352 to remain in inoperative position for the length of time necessary to permit the valve arm 403 of the filling head (beneath which there is no bottle), to entirely clear the trip 352. Furthermore, the contacting portion of lever 371 is long enough to cause one roller 308 to always be in contact therewith, and with one roller coming into contact just as another roller passes out of contact. This renders the lever immediately sensitive to the position of each incoming roller and since one roller 308 will always be beneath the lever, the lever will be held at either normal or slightly raised position. Because of this, no other stop means need be provided to prevent the lever 371 from dropping entirely down to vertical position.

The pivot 372 of the lever 371 has an eccentric portion which seats in the bore therefor in the bracket 373. By this arrangement, the normal position of the lever 371 may be varied to obtain the desired operation and timing. The eccentric portion may be held properly locked to hold the pivot 372 at the desired elevation by means of a set screw 394. The springs 386 and 382 which normally hold the valve stems 375 and 376 in the position shown in Figure 10, likewise serve to hold the lever 371 in normal downward position. The spring 376b between the head of the tappet 376a and the upper surface of the lever 371 will permit the lever 371 to move very slightly upwardly without affecting the seating of the valve 379 since the latter will momentarily be held seated by its spring 382. Such a compensating arrangement is necessary due to the fact that bottles of the same capacity may vary slightly in height. The slight upward movement of the lever 371 referred to may move the release valve stem 375 upwardly without affecting the position of the counter-pressure trip 352, or the tappet 375a may be adjusted to such a position that it will not unseat the release valve 384 by a slight upward movement of the lever 421.

*The disk valve type of filling head*

The disk valve type of filling head used in our machine is illustrated in Figures 11 to 20, inclusive. The filling head 400 comprises a body portion 402 and a disk valve 403, the valve being seated in a depression 410 on the front or outer face of the valve body. The valve is rotatably mounted upon a stud 411 threaded into a socket 412 extending inwardly from the valve seat or depression 310. A leather washer 413 and a rubber washer 414 are positioned in the valve seat 410 between the valve seat face 415 and the face 416 of the valve. The rubber washer 414 is placed in contact with the valve seat face 415 and the leather washer 413 is positioned between the face 416 of the valve and the rubber washer, the smooth or finished face of the leather washer being positioned in contact with the valve face 416.

The valve 403 is held in close sealing contact with the leather washer 413 by means of a nut 417 threaded on the outer end of the stud 411. The central portion 418 of stud 411 is unthreaded to permit the valve 403 to readily turn thereon and an anti-friction device 419 is interposed between the nut 417 and the outer face of the valve 403 to permit the valve to turn freely with respect to the nut. This anti-friction device comprises a collar 420 having an inwardly extending flange 421. A metal washer 422 and a rubber washer 423 are positioned on the outer side of the flange 421, the metal washer bearing against the nut 417. The inner end of the collar 420 is provided with an inwardly projecting shoulder 424 which holds a washer 425 in position at that end of the collar. Anti-friction bearings 426 are positioned between the washer 425 and the inner surface of the flange 421 in order that the washer 425 may be freely rotatable.

It will be obvious that the anti-friction device 419 will permit the nut 417 to be tightened to the extent necessary to maintain a tight seal between the disk valve 403 and the valve body 402, without exerting any appreciable retarding effect upon the rotation of the valve 403.

Since the finished or smooth face of the leather washer 413 is in contact with the face 416 of the valve disk, contact between the two will exert a minimum retarding effect against rotation of the valve disk and the rubber washer 414 behind the leather washer will prevent the escape or flow of gas or liquid behind and between the washers and faces of the valve body and valve disk. The washers are provided with ports aligned with ports in the valve body 402 and small collars 427 seated in the ports in the valve body extend into the ports in the washers, thereby preventing rotation of the washers with respect to the valve body.

As has been heretofore stated, the valve disk 403 is provided with a valve lever 406.

The lower surface of the valve body 402 is provided with a downwardly projecting portion 428 having a central bore 429 therein. A collar 430 is held tightly in engagement with the downwardly extending portion 428 by means of a flanged nut 431 threaded upon the downwardly extending portion 428. A gasket 432 is positioned between the collar 430 and the downwardly extending portion 328. A filling tube 433 extends from the enlarged lower end of the bore 429 of the extended portion 428 and through the collar 430, the upper end of the tube being provided with an annular flange 434 which seats upon the upper surface of the collar 430. A preferably conical head 435 is threaded upon the lower end of the tube 433, this head being provided with radial apertures 436. A sleeve 437 is positioned upon the filling tube 433, the sleeve and tube forming the filling nozzle 404. The lower end of the sleeve 437 rests upon the conical head 435 while the upper end of the sleeve extends up into the enlarged lower end of the bore 438 through the collar 430. A packing ring 439 seated in a groove in the bore 438 surrounds the upper end of the sleeve 437.

The centering bell 405 is slidably mounted upon the filling nozzle 404, and is provided with a compressible packing ring 440 against which the mouth of the bottle is adapted to be pressed.

As will hereinafter be more fully explained, the centering bell 405 is adapted to be moved upwardly upon the filling nozzle 404 by upward movement of the bottle to be filled, and, by this movement, the upper surface of the centering bell will be brought into contact with a packing ring 441 provided upon the lower end of the collar 430 and projecting past the lower end of the collar to provide a tight seal between the centering bell and collar.

The valve body 402 is adapted to be connected to the filling reservoir 147 by pipes 442 and 443 (Fig. 1). Referring to Figure 2, it will be observed that in the filling reservoir 147 the pipe 443 opens into the lower portion of the reservoir and beneath a body of charged water while the pipe 442 extends above the level of the charged water and opens to a body of gas which is maintained above the charged water in a manner hereinafter set forth. A pipe 442 and a pipe 443 are provided for each filling head 400. The pipes 442 and 443 extend into the rear surface 444 of the valve body, these pipes respectively communicating with passages extending through the valve body to front or valve seat face 415 thereof. Other passages lead downwardly from the front face 415 of the valve body to the water, gas and snifting passages of the filling nozzle 404. The valve disc 403 is provided with a number of double-ended or substantially U-shaped passages which are adapted to bridge corresponding passages in the valve body 402 so that the filling nozzle 404 will be properly connected, seriatim, to the valve body 402 to carry out the various steps of the filling cycle by reason of the turning of the valve disc 403.

The arrangement of the passages in the valve body 402 and valve disc 403 will be more clearly understood from a description of the various steps of the filling cycle take in connection with Figures 17 to 20 inclusive. However, Figure 11 shows these passages in front elevation and with the valve disc 403 turned slightly in a clockwise direction with respect to the valve body 402 from the position which it would occupy during the snifting step of the filling cycle. The valve disc is turned in the manner noted in order that the arrangement of the various passages may be more clearly observed.

When the filling mechanism is rotated to bring a filling head 400 to a position where the downwardly extending valve arm 407 of the valve lever 406 thereof will contact with the counter-pressure trip 352 (Figure 1), the valve 403 will be turned, in a counter-clockwise direction (Figures 11 and 15) from snifting position (the position it occupies when a bottle in placed beneath the head and which is shown in solid lines in Figure 15) to counter-pressure position (shown in dotted lines in Figure 15). The counter-pressure passages in the valve body and valve disc will then be aligned as diagrammatically illustrated in Figure 17. Referring to Figure 17, the gas flow pipe 442 connected to the rear surface of the valve body 402 is open to two passages 450 and 451 extending through the valve body 402. A passage 452 which extends through the valve disc 403 parallel with the inner surface 416 of the valve disc, is provided with short axial passages 453 and 454 which are respectively aligned with the inner ends of the passages 450 and 451 in the valve body. A third axial passage 455 extending from the passage 452 is aligned with a short axial passage 456 in the valve body 402 which leads to a vertical passage 457 in the valve body. The passage 457 is aligned, as shown in Figures 11 and 17, with a counter-pressure and vent passage 458 which extends diagonally through the collar 430, the lower end of the passage 458 opening into a passage 459 between the filling tube 433 and the sleeve 437 which surrounds the filling tube. The passage 459 is provided by flattening one outer surface of the filling tube 433, this flattened portion extending sufficiently far up upon the tube 433 to terminate above the upper end of the sleeve 437 so that it may communicate with the passage 458. The lower end of the flattened passage 459 terminates beneath small apertures 460 in the lower end of the sleeve 437 (Figure 11).

When the valve disc is turned to align the various passages in the manner described above, gas will flow from the upper portion of filling reservoir 147 through pipe 442 to passages 450 and 451 in the valve body, through passages 453 and 454 to passage 452 and from passage 452 through passages 456, 457, 458 to passage 459 in the filling nozzle and thence through one of the apertures 460 to the interior of the bottle, thereby establishing the same pressure in the bottle as exists in the filling reservoir 147 above the level of the water therein. It will be noted that a check valve 461 is provided at the enlarged inner end of the valve body passage 450 but when gas is flowing in the manner described, this ball valve will be loose and unseated in the passage 450 so that gas may flow through this passage.

As the filling mechanism continues to rotate, the downwardly extending valve arm 407 of filling valve disc 403 will strike the filling trip 353 so that the valve lever will move in a counter-clockwise direction to the filling position illustrated in dotted lines in Figure 15. This will move the valve disc to a position wherein the passage 452 in the valve disc and certain of the axial passages aligned therewith will be aligned with passages in the valve body as is shown in Figure 18, to permit air and the gas which has been placed in the bottle to be vented from the bottle while another passage 462 will be connected (as diagrammatically shown in Figure 19) with passages in the valve body to permit charged water to flow from the filling reservoir 147 to the bottle.

Referring to Figure 18, it will be observed that the axial passage 454 in the valve will be aligned with the axial passage 450 in the valve body while a fourth short passage 463 in the valve and extending from the passage 452 to the inner face of the valve disc will now be aligned with the passage 456 in the valve body which leads to the passage 459 in the filling nozzle. Referring to Figure 19, the second passage 462 in the valve disc will be aligned with a generally axial passage 464 in the valve body 402. The passage 464 communicates with an offset passage 465 having an enlarged portion 466 through a plug valve 467 seated in a vertical bore 468 in the valve body. The plug valve 467 includes a central vertical bore 469 and two transverse ports 470 and 471 communicating, respectively, with the passage 464 and the passage 465. The water pipe 443 from the filling reservoir 147 is connected to the enlarged portion 466 of the passage 465 and when the valve 467 is in the position shown, charged water may flow through passage 465 and valve 467 to the passage 464.

The valve 467 is provided with a stem 472 and a knurled handle 473 by means of which the valve may be rotated to adjust its position. Packing 474 is provided about the stem 472 and a sleeve 475 is threaded in the bore 468 to hold the packing properly clamped. Passage 462 is provided with a short axial passage 477 which, with the parts in the position shown in Figure 19, is aligned with the water passage 464 and a second short passage 478 extends from the passage 462 in the disc valve to an angled water passage 479 extending downwardly through the valve body to the interior of the filling tube 433.

By the arrangement described above, charged water will flow into the enlarged portion 466 of the passage 465, through valve 467 to passage 464, and thence through passages 477, 462 and 468 in the disc valve to the water passage 479 and tube 433. From the tube 433, the water will pass through the apertures 436 in the conical head 435 of the filling nozzle 404. Due to the fact that the pressure in the bottle has already been established, by the counter-pressure step previously described, at the same pressure as the pressure of the body of gas above the water in the filling reservoir 147, the water from the reservoir 147 will only flow to the bottle by reason of the slight elevation of the tank 147 above the bottle. The head of this water never exceeds two pounds, and the water will therefore only flow at a very slow rate. This will result in a gradual filling of the bottle without agitation of the syrup or water. During the time that the water is flowing into the bottle, the air and gas in the bottle will be vented through the passages shown in Figure 18, the air and gas leaving the bottle through the small apertures 460 in the sleeve 437 and passing up through the passage 459 to the passage 458 and then through passage 457, passage 456 and through the disc valve 403 by passages 463, 452 and 454 to the axial passage 450 in the valve body 402 and then through the pipe 442 back to the upper portion of the filling reservoir 147.

Water will continue to flow into the bottle so long as the gas and air in the bottle is provided with a means of escape but when the bottle is filled with water up to the ports 460 in the sleeve 437, the air and gas remaining in the bottle above the level of the water will have no path of escape and will be compressed to some extent by reason of the fact that the water will rise very slightly above these ports and will then begin to flow through the ports 460 and through the flattened passage 459 in the circuit previously followed by the venting air and gas. Water may flow through this venting passage until the level of the water in the pipe 442 reaches the level of the water in the tank 147, but the water valve 467 on the valve body 402 and the speed and timing of the entire machine are so adjusted as to cause the bottle being filled to reach the point at which the snifting trip 354 is located before any considerable amount of water may flow up the venting passages or gas pipe 442. The venting passages and pipe are also of such diameter that but a very small quantity of water will flow through this passage. The amount of water which may flow through the passage is also limited by the fact that the filling reservoir 147 is positioned as closely as possible to the bottle, and the pipe 442 through which the water may flow upwardly is as straight as possible.

The advantages of the above arrangement whereby a minimum amount of water may flow through the vent tube are reflected in the small amount of water which may be discharged into a fresh bottle when the filling head is again operated to counter-pressure position.

The arrangement described above whereby the bottle may only be filled up to the vent ports 460 in the sleeve 437 is of distinct importance in the bottling trade since it insures that every bottle will be filled to a certain distance measured from the top of the bottle. It is very desirable to the bottling trade to have bottles filled exactly to the same height from the top of the bottle and, by our arrangement, this can be accomplished regardless of variances in the capacity of bottles of similarly rated sizes.

The tube 437 of the filling nozzle is provided with a second pair of ports 460' which, as shown in Figure 11, are below the ports 460 on the tube and are circumferentially spaced from the latter ports so that both sets of ports cannot be in alignment with the flattened passage 459. The apertures 460 are ordinarily used for filling 8 ounce bottles, but when bottles of a larger diameter are to be filled, for example, quart bottles, the sleeve 437 may be rotated upon the tube 433 to move the ports 460 out of alignment with the flattened passage 459 and to the lower ports 460' in alignment with the lower end of the passage. Bottles of larger sizes than the 8 ounce size are, according to standard practices, filled to a greater distance from the top of the bottle than the 8 ounce bottles and the lower ports 460' will therefore serve for such bottles. It will be understood that additional ports similar to 460 and 460' may be spaced along and about the sleeve 437 to fill bottles of other sizes to the proper height.

In the event that a bottle should be broken during the filling step, described above, the pressure of the water flowing downwardly through the pipe 443 will cause a ball valve 466' provided in the enlarged portion 466 of passage 465 to seat against the opening in passage 465, thereby preventing the undue escape of water. If any gas should flow outward by gas line 442 it will also be cut off by reason of the fact that the ball valve 461 in the enlarged end of the passage 450 through which gas and air has previously been vented will move to close this passage. It may be stated here that should a bottle break during the counter-pressure step illustrated in Figure 17, gas will be free to flow to atmosphere through the passage 451 and the passages connecting the latter to the bottle. However, the counter-pressure step is of such short duration that no appreciable amount of gas will be wasted.

Continued rotation of the filling head will cause the upwardly extending valve lever 408 on the valve disc to contact with the snifting trip 354 so that the valve disc will be rotated in a clockwise direction to the position shown in full lines in Figure 11 to place the snifting ports of the valve body and valve disc in alignment. By this movement, the water passage through the tube 433 and the flattened passage 459 between the tube 433 and sleeve 437 will be entirely closed. Snifting is accomplished through very small kerfs or cut-outs 485 (Figures 11 and 12) circumferentially spaced about the wall of the bore through the centering bell 405, the inner faces of the cut-outs being closed by the sleeve 437. The kerfs or cut-outs 485 open into the space in the bottle between the filling nozzle 404 and the inner wall of the mouth of the bottle, the mouth of the bottle of course being pressed tightly against the packing ring 440 in the centering bell.

The upper ends of the kerfs 485 open into an annular chamber 486 in the lower end of the collar 430, this chamber being sealed to the atmosphere by the presence of the packing ring 441 between the lower face of the collar 430 and the upper face of the centering bell 405. From the chamber 486, a passage 487 extends upwardly through the collar 430 and is aligned with a passage 488 at one side of the water passage 479 (Figure 11). Referring to Figure 20, it will be noted that the passage 488 includes a portion 489 extending axially of the valve body 402 and which is now in alignment with one arm of a U-shaped passage 490 in the valve disc. The other arm of the U-shaped passage 490 is in alignment with an axial passage 491 in the valve body which has an upwardly extending portion opening into a valve chamber 492. From the valve chamber 492, a diagonal passage 493 extends to the exterior of the valve body.

Snifting will occur through the passages described above, the rapidity of the snifting being governed by a needle valve 494 threaded in the upper portion of the valve chamber 492 and provided with a knurled head 495. The needle valve 494 may be locked in adjusted position by a lock nut 496.

It will be observed that the filling head structure described above insures that the water will flow quietly into the bottle; will only rise to a predetermined height in the bottle; and that each step of the filling cycle will be conducted in proper timed relation to the other steps. The structure described above will also prevent waste of filling water and gas by reason of the breaking of a bottle.

*The filling reservoir*

The filling reservoir 147 of the filling mechanism 52 is rotatably mounted at the upper end of the column 57 which supports the filling mechanism. It will be observed that an insulated covering 501 within an outer casing 502 encloses the reservoir. Water tubes 443 extend from the lower portion of the reservoir 147 to each of the filling heads 400 and counter-pressure or vent tubes 442 extend through the bottom wall of the reservoir to a point near the upper portion of the reservoir, one of the tubes 442 also being provided for each of the filling heads 400. Only one set of these tubes is illustrated in Figure 2. As is shown in Figure 2, the tubes 442 and 443 are enclosed within a body of insulating material designated by the numeral 503 and positioned between the supporting skirt 146a of the reservoir and a cover 504.

As is shown in Figure 2, and as has been described, the column 57 upon which the filling reservoir 147 is mounted encloses and rotates about an upright pipe 154 through which carbonated filling water is supplied to the reservoir. Pipe 154 extends beneath the base 58 to a carbonater of any desired type.

The filling reservoir of our preferred construction is described in detail in our above-mentioned divisional application filed April 19, 1938, the structure being such that a proper level of water will be maintained in the reservoir, with a substantially uniform body of gas at uniform pressure above the water.

After the bottles have been snifted, the continued rotation of the filling mechanism will move them back toward the transfer spider 65. As the bottle supporting platforms 67 move along worktable 56, the roller 308 in each platform will move into engagement with the cam track 319, moving the bottle platform downwardly to the level of the worktable, as is shown in Figures 2 and 3. The timing of the rotation of the filling mechanism and the transfer spider is such that a bottle will be presented to each pocket 260 of the transfer spider as the pocket moves across a bottle supporting platform 67. In order to insure that the bottles are removed from the platforms 67, a guide member 525 is positioned upon the worktable 56 beneath the transfer spider and extends out over the path of the platforms 67 and beneath the bottle engaging members 320. As is best shown in Figure 1, the guide member 525 has the right hand face thereof curved to define the path of travel of the bottles from the platforms and into the pockets of the transfer spider. In order to hold the bottles in the transfer spider and guide their movement thereabout, a guide element 526 is adjustably fixed upon the surface of the worktable 56 adjacent the right hand side of the path of travel of the transfer spider. The bottles are moved by the transfer spider about the right hand side thereof and onto the table 68 of the crowning mechanism 53 into the pockets 527 of the crowning spider 69.

As is described in our above-mentioned divisional application filed April 19, 1938, the table 68 of the crowning mechanism 53 and the spider 69 thereof are of exactly the same construction as the table and spider of the syruping mechanism 51. The crowner comprises four crowning heads equidistantly spaced about the crowner supporting structure which is keyed to the rotating hollow shaft 55, the heads being vertically slidable in the supporting structure, with one head in alignment with each crowner spider pocket 527, so that as bottles move about the spider they will be crowned before being moved to the outfeed spider 70, which moves them between guides 588 and 590 and places them on the outfeed end of the straight-line conveyor 60 as described in our above-mentioned divisional application filed April 19, 1938.

The operation of the various mechanisms disclosed herein has been specifically set forth in connection with the structures of such mechanisms. All features disclosed but not claimed are claimed in our divisional application for Filling head, Serial No. 6,720, filed February 15, 1935, or our divisional application for Filling machine, filed April 19, 1938.

It will be understood that the invention is not limited to the details of construction shown in the drawings and that the examples of the use of the machine and mechanisms which have been given do not include all of the uses of which they are capable and that the phraseology employed in the specification is for the purpose of description and not of limitation.

We claim:—
1. The combination in a filling machine having a reservoir for liquid and gas, of a filling head including a valve body, the valve body having a series of ports therethrough for liquid and gas communicating with the reservoir and leading to one face of the valve body, a filling nozzle on the filling head and adapted to be positioned in a container, the valve body having a second series of ports leading from said face of the valve body to the filling nozzle, a valve mounted upon said face of the valve body and having ports therein adapted, upon seriatim movements of the valve, to bridge corresponding ports of the two series of ports in the valve body to permit gas to flow from the reservoir to a container, to subsequently permit liquid to flow from the reservoir to the container and to simultaneously vent the con- tainer, and the valve body having a port extending from the filling nozzle to said face thereof and a corresponding port extending from said face to atmosphere, said last named ports being adapted to be placed in communication by a port in the valve upon further movement of the valve to permit the container to be snifted.

2. The combination in a filling machine having a reservoir for liquid and gas, of a filling head including a valve body, the valve body having a series of ports therethrough for liquid and gas communicating with the reservoir and leading to one face of the valve body, a filling nozzle on the filling head and adapted to be positioned in a container, the valve body having a second series of ports leading from said face of the valve body to the filling nozzle, a disk valve rotatably mounted upon said face of the valve body and having ports therein adapted, upon seriatim movements of the valve, to bridge corresponding ports of the two series of ports in the valve body to permit gas to flow from the reservoir to a container, to subsequently permit liquid to flow from the reservoir to the container and simultaneously vent the container, and the valve body having a port extending from the filling nozzle to said face thereof and a corresponding port extending from said face to atmosphere, said last-named ports being adapted to be placed in communication by a port in the valve upon further movement of the valve to permit the container to be snifted.

3. The combination in a filling machine having a reservoir for liquid and gas, of a filling head including a valve body, the valve body having a series of ports therethrough for liquid and gas communicating with the reservoir and leading to one face of the valve body, a filling nozzle on the filling head and adapted to be positioned in a container, the valve body having a second series of ports leading from said face of the valve body to the filling nozzle, a valve mounted upon said face of the valve body and having ports therein adapted, upon seriatim movements of the valve, to bridge corresponding ports of the two series of ports in the valve body to permit gas to flow from the reservoir to a container, to subsequently permit liquid to flow from the reservoir to the container and to simultaneously vent the container, and the valve body having a port extending from the filling nozzle to said face thereof and a corresponding port extending from said face to atmosphere, said last-named ports being adapted to be placed in communication by a port in the valve upon further movement of the valve to permit the container to be snifted, one of the valve body ports through which liquid flows being provided with a valve to control the rate of flow of the liquid.

4. The combination in a filling machine including a reservoir for liquid and gas, of a filling head including a valve body, the valve body having a series of ports therethrough for liquid and gas communicating with the reservoir and leading to one face of the valve body, a filling nozzle on the filling head and adapted to be positioned in a container, said filling nozzle including a filling tube and a sleeve thereabout, a second series of ports in the valve body extending from said face thereof and respectively communicating with said filling tube and sleeve, a valve on said face of the filling head having ports therein adapted, upon seriatim movements of the valve to bridge corresponding ports of the two series of ports in the valve body to permit counterpressure flow from the reservoir to the container through said sleeve, to subsequently permit liquid to flow from the reservoir to the container through said filling nozzle and to permit simultaneous vent flow from the container to the reservoir through the sleeve, the valve body having a port extending from the upper portion of the filling nozzle to said face of the valve body and a corresponding port extending from said face to atmosphere, said last named ports being adapted to be placed in communication by a port in the valve upon further movement of the valve to permit snifting flow.

5. The combination in a filling machine having a reservoir for liquid and gas, of a filling head including a valve body, the valve body having a series of ports therethrough for liquid and gas communicating with the reservoir and leading to one face of the valve body, a filling nozzle on the filling head, said filling nozzle including a filling tube and a sleeve thereabout, a second series of ports in the valve body extending from said face thereof and respectively communicating with said filling tube and sleeve, a valve on said face of the filling head having ports therein adapted, upon seriatim movements of the valve, to bridge corresponding ports of the two series of ports in the valve body to permit counter-pressure flow from the reservoir through said sleeve, to subsequently permit liquid to flow from the reservoir through said filling nozzle and a simultaneous vent flow through the sleeve and the ports aligned therewith, and said valve body having a port extending from said face to the upper portion of the filling nozzle exteriorly of said sleeve and a corresponding port extending from said face to atmosphere, said last named ports being adapted to be placed in communication by a port in the valve upon further movement of the valve to permit snifting flow.

6. A filling head including a filling nozzle, said filling head having ports therethrough communicating with a filling reservoir and extending to a valve seat in the filling head, a second series of ports extending from said valve seat to the filling nozzle, a valve on said valve seat to place corresponding ports of said series of ports in communication seriatim to permit counter-pressure, liquid and liquid venting and snifting flow through the ports, and valves in the passages through which liquid and snifting flow occurs to regulate the degree of such flow.

7. The combination in a filling head of a valve body and a valve movably mounted upon the valve body, the valve body and valve being respectively provided with corresponding passages adapted to be placed in alignment upon movement of the valve, a packing between the valve and valve body, said packing being provided with ports aligned with the valve body passages and comprising a sealing disc of non-porous and resilient material adjacent the valve body and a disc of porous material adjacent the valve.

8. The combination in a filling head, of a valve body and a valve movably mounted upon the valve body, the valve body and valve being respectively provided with corresponding passages adapted to be placed in alignment upon movement of the valve, a packing between the valve and valve body, said packing being provided with ports aligned with the valve body passages and comprising a rubber disc adjacent the valve body and a leather disc adjacent the valve, and means to hold said valve in contact with said packing including a resilient element.

9. The combination in a filling head, of a valve body and a valve movably mounted upon the valve body, the valve body and valve being respectively provided with corresponding passages adapted to be placed in alignment upon movement of the valve, a packing between the valve and valve body, said packing being provided with ports aligned with the valve body passages and comprising a non-porous and resilient disc adjacent the valve body and a porous disc adjacent the valve, the porous disc having a smooth face contacting with the valve and a rough face contacting with the non-porous disc and means to hold said valve in contact with said packing including a resilient element.

10. The combination in a filling head, of a valve body, a stud on the valve body, and a valve rotatable on the stud, of means to hold the valve positioned against the valve body comprising an anti-friction member mounted on the stud and contacting with the valve, and locking means bearing against said member to hold the valve and member pressed inwardly toward the valve body, a resilient member being interposed between the anti-friction member and locking means.

11. The combination in a filling machine of a moving filling mechanism, a filling head carried by said mechanism, a filling valve on the filling head, a plurality of valve actuating means spaced along the path of travel of the filling head and adapted to successively operate the valve when a bottle is in filling position, means to render one of said actuating means inoperative when a bottle is not in filling position, the succeeding actuating means being so positioned that they will then fail to actuate the filling valve.

12. The combination in a filling mechanism of a moving filling head, a filling valve on the filling head, a vertically movable bottle platform beneath the head, engaging means carried by the platform, valve trips spaced along the path of travel of the filling head and adapted to successively contact the valve, means to move the bottle platform to a predetermined position when a bottle is carried thereby, said last-named means being adapted to move the platform to a second position when no bottle is carried by the platform, means operated by said engaging means when the platform is in the second position to render one of said valve trips inoperative, the succeeding valve trips being so positioned that they will fail to contact with the filling valve when it is not operated by said inoperative trip.

13. The combination in a rotary filling mechanism of a filling head including a movable valve and a vertically movable bottle platform, of means to move the bottle platform toward the filling head when a bottle is positioned thereon to place the bottle in filling position, a cam on the platform, a valve trip in the path of movement of the filling head and adapted to move the valve to counter-pressure position when a bottle is properly positioned on the bottle platform, a second valve trip adapted to subsequently engage the valve, said platform moving means being adapted to move the platform to a position other than normal bottle supporting position when no bottle is carried thereby, means actuated by said cam when the platform is in the latter position to render said first trip inoperative, said second trip being so positioned that it will fail to make contact with the valve when the latter is not actuated by said first-named trip.

14. The combination in a rotary filling mechanism of a filling head including a movable filling valve and a movable bottle platform, spring means to move the bottle platform toward the filling head when a bottle is positioned thereon, a cam carried by the platform, a valve trip in the path of movement of the head and adapted to move the filling valve to counter-pressure position when a bottle has been properly positioned on the bottle platform, a second valve trip adapted to subsequently engage the valve at its counter-pressure position and move the same to filling position, a counter-pressure trip controlling device, the absence of a bottle from the bottle platform permitting said spring means to move the platform to cause said cam to actuate said controlling device to move the counter-pressure trip to inoperative position, said second trip being so positioned that it will then subsequently fail to engage the valve.

15. The combination in a moving filling mechanism of a filling head including a filling valve and a bottle platform, valve actuating means arranged in the path of travel of the filling head, a pressure circuit to normally hold said actuating means in position to actuate said valve, means to maintain said pressure circuit, means carried by the bottle platform and adapted when no bottle is positioned on the bottle platform to actuate said maintaining means to release said pressure circuit and means to move the valve actuating means to non-actuating position upon the release of pressure in the pressure circuit.

16. The combination in a rotary filling mechanism of a filling head including a filling valve and a vertically movable bottle platform, spring means to move the bottle platform toward the filling head when a bottle is positioned thereon, a cam on the platform, a movable trip in the path of movement of the head and adapted to move the valve to counter-pressure position when a bottle has been positioned on the filling platform, a circuit having pressure normally maintained therein to hold the trip in operative position, a second trip carried by the base adapted to subsequently engage the valve and move the same to filling position, a counter-pressure trip controlling device normally maintaining the pressure circuit, the absence of a bottle from the bottle platform permitting the spring means to move the platform upwardly to permit the platform cam to actuate the counter-pressure trip controlling device to release the pressure in the pressure circuit, means to move the counter-pressure trip to non-tripping position, said filling trip being so positioned that it will subsequently fail to move the valve to filling position.

17. The combination with a moving filling mechanism including filling heads having filling valves and bottle supporting platforms and filling valve operating means arranged in the path of movement of the filling valves, of a cam on each bottle platform, a trip lever operatively connected to the valve operating means and arranged to be moved from normal position by the cam of a bottle platform to render the operating means inoperative with respect to the filling valve corresponding to that platform when no bottle is properly positioned on said platform, said trip lever being supported in normal position by normal contact of a plurality of cams therewith and being responsive to the position of each cam.

18. The combination with a filling mechanism including moving filling heads having rotatable valves therein, of a trip member normally projecting into the path of movement of the filling head valves to rotate the latter, said trip member being constructed and arranged to be moved out of said path of movement by resistance of a valve against rotating movement.

19. The combination in a filling head, of a body portion having a water passage therethrough, a tube depending from the body portion and communicating with the water passage, said tube having a channel in its outer surface, a vent and counterpressure passage in said body arranged to communicate with the channel, a sleeve rotatable on said tube and enclosing the channel, said sleeve being provided with apertures adjacent its lower end adapted to be selectively aligned with the channel, said sleeve extending into said body portion, said body portion having a snifting passage opening to its lower end adjacent the exterior of said sleeve, and sealing means in the body portion about said sleeve and between said counterpressure and vent passage and said snift passage.

20. A filling head including a body portion having a water passage, a vent and counterpressure passage and a snift passage therethrough, a filling nozzle depending from the body portion, said nozzle comprising a filling tube having a water passage therethrough and a sleeve about the tube to form a vent and counterpressure passage between the tube and sleeve, the passages in said tube and sleeve being aligned with the corresponding passages in the body portion of the filling head, a centering bell slidable on the sleeve and adapted to be moved upwardly thereon and into sealing contact with the filling head upon contact of the bell with a bottle to be filled, said centering bell being provided with a passage therethrough opposite the sleeve, a sealing ring within said centering bell against which the mouth of the bottle is adapted to contact, the lower end of the passage in the centering bell being within and above said sealing ring, the bell passage being aligned with the snift passage of the body portion when the centering bell is raised against said body portion, said sleeve about the filling tube being provided with apertures adjacent its lower end adapted to be selectively aligned with the passage between the tube and sleeve to vary the height of filling.

21. The combinaiton with a filling mechanism including moving filling heads having rotatable valves therein, of a rotatably mounted trip member normally projecting into the path of movement of the filling head valves to rotate the latter, means to tend said trip to such position and to enable it to turn out of said path of movement upon resistance of a valve against rotating movement.

22. The combination in a filling head, of a valve body element and a valve element movably mounted upon the valve body element, said elements being respectively provided with corresponding passages adapted to be placed in alignment upon movement of the valve element, a packing between said elements and secured to one of said elements, said packing being provided with ports aligned with the passages of the element to which it is secured and comprising a disc of non-porous and resilient material adjacent the element to which the packing is fixed, and a disc of porous material adjacent the other element.

23. The combination in a filling head, of a valve body element and a valve element movably mounted upon the valve body element, said elements being respectively provided with corresponding passages adapted to be placed in alignment upon movement of the valve element, a packing between said elements and secured to one of said elements, said packing being provided with ports aligned with the passages of the element to which it is secured and comprising a disc of non-porous and resilient material adjacent the element to which the packing is fixed, a disc of porous material adjacent the other element, and means to hold said elements and packing in contact including a resilient element.

24. The combination in a filling machine having a reservoir for liquid and gas, of a filling head including a valve body, the valve body having a series of ports therethrough for liquid and gas communicating with the reservoir and leading to one face of the valve body, a filling nozzle on the filling head and adapted to be positioned in a container, the valve body having a second series of ports leading from said face of the valve body to the filling nozzle, a disc valve rotatably mounted upon said face of the valve body and having ports therein adapted, upon seriatim movements of the valve, to bridge corresponding ports of the two series of ports in the valve body to permit gas to flow from the reservoir to a container, to subsequently permit liquid to flow from the reservoir to the container and simultaneously vent the container, and a valve body having a port extending from the filling nozzle to said face thereof and a corresponding port extending from said face to atmosphere, said last-named ports being adapted to be placed in communication by a port in the valve upon final movement of the valve to permit the container to be snifted.

GEORGE J. HUNTLEY.
ROBERT J. STEWART.